United States Patent
Cullen

(10) Patent No.: US 9,325,936 B2
(45) Date of Patent: Apr. 26, 2016

(54) HYBRID VISUAL COMMUNICATION

(71) Applicant: Samsung Electronics, Ltd., Gyeonggi-do (KR)

(72) Inventor: Schuyler Cullen, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 50 days.

(21) Appl. No.: 14/052,803

(22) Filed: Oct. 14, 2013

(65) Prior Publication Data

US 2015/0042743 A1 Feb. 12, 2015

Related U.S. Application Data

(60) Provisional application No. 61/864,446, filed on Aug. 9, 2013.

(51) Int. Cl.
*H04N 7/14* (2006.01)
*G06K 9/00* (2006.01)

(52) U.S. Cl.
CPC ............ *H04N 7/141* (2013.01); *G06K 9/00302* (2013.01)

(58) Field of Classification Search
None
See application file for complete search history.

(56) References Cited

U.S. PATENT DOCUMENTS

| | | |
|---|---|---|
| 7,006,102 B2 | 2/2006 | Rowe |
| 7,139,439 B2 | 11/2006 | Hwang |
| 7,657,083 B2 | 2/2010 | Parr |
| 8,315,461 B2 | 11/2012 | Free |
| 2004/0119723 A1 | 6/2004 | Inoue |
| 2006/0280342 A1* | 12/2006 | Lee .............. G06K 9/4661 382/118 |
| 2007/0104360 A1 | 5/2007 | Huang |
| 2010/0215255 A1* | 8/2010 | Xiao ............. G06K 9/621 382/159 |
| 2010/0289872 A1* | 11/2010 | Funabiki ........ G09G 3/003 348/43 |
| 2011/0069139 A1* | 3/2011 | Liu .............. H04N 7/147 348/14.07 |
| 2011/0283190 A1 | 11/2011 | Poltorak |
| 2011/0292051 A1 | 12/2011 | Nelson |
| 2013/0121409 A1 | 5/2013 | Bourdev |
| 2013/0127827 A1 | 5/2013 | Shiell |
| 2013/0129158 A1 | 5/2013 | Wang |
| 2015/0002734 A1* | 1/2015 | Lee .............. H04N 5/2256 348/367 |

FOREIGN PATENT DOCUMENTS

| | | |
|---|---|---|
| FR | 2907298 | 4/2008 |
| KR | 10-2008-0050036 | 6/2008 |
| WO | 2005055602 | 6/2005 |

* cited by examiner

*Primary Examiner* — Maria El-Zoobi
(74) *Attorney, Agent, or Firm* — Convergent Law Group LLP

(57) ABSTRACT

Exemplary embodiments for visual communication between a first device and a second device, comprising: using data from a camera system to create a 3D mesh model of a first device user, wherein the 3D mesh model is made available for storage on the second device for subsequent display on the second device; during the visual communication session between the first device and the second device, receiving sensor data from a sensor array, including image data capturing changing facial expressions and motion of the first device user; using the image data to determine 3D mesh model updates; transmitting the 3D mesh model updates to the second device for the second device to update display of the 3D mesh model of the first device user; and receiving from the second device for display on the first device at least one of a 2D video stream or updates to a 3D mesh model of a second device user.

37 Claims, 4 Drawing Sheets

3D Mesh Model 300

Blend Shapes 400

HYBRID VISUAL COMMUNICATION

CROSS-REFERENCE TO RELATED APPLICATIONS

This application claims the benefit of provisional Patent Application Ser. No. 61/864,446, filed Aug. 9, 2013, assigned to the assignee of the present application, and incorporated herein by reference.

BACKGROUND

Existing video communication system and services, such as Skype™ and Google Hangout™, transmit 2D video streams between devices running player applications. Such video communication systems typically transmit video streams of compressed sequential images paired with audio streams between the devices. Most video communication systems for use by an individual user require a player application running on a computer device that includes a camera and a display. Examples of the computer device may include a desktop or laptop computer having a camera mounted at the top of the screen, or a mobile phone with the front facing camera built in to a bezel at the top.

While advantageously providing users with video capability, existing video communication systems have several drawbacks. For example, existing video communication systems typically require high bandwidth and are inherently high latency as entire image sequences need to be generated and compressed before transmitting the signal to the another device. In addition, for low latency and high quality applications, existing video communication systems require the communicating devices to transmit over Wi-Fi, 3G, or 4G mobile communication technology.

Another problem with most video communication setups, whether on a desktop, laptop, or mobile phone, is that the user appears to be looking down to the person to which they are communicating via video because the user's gaze direction is at the display of the device, which is typically below where the camera is mounted. This camera/display geometry disparity prevents users from having a conversation while looking each other in the eye. The related problem is that transmission of a video comprising 2D image sequences of a person also loses 3D depth information about their face.

There are also systems that may transmit a graphical representation of the user's alter ego or character, commonly referred to as an avatar, but avatars typically fail to convey the user's actual likeness, facial expressions, and body motion during the communication.

Accordingly, a need exists for a visual communication system capable of displaying the user's actual likeness, facial expressions, and motion in real time, while reducing bandwidth.

BRIEF SUMMARY

The exemplary embodiment provides methods and systems for visual communication between a first device and a second device. Aspects of exemplary embodiment include using data from a camera system to create a 3D mesh model of a first device user, wherein the 3D mesh model is made available for storage on the second device for subsequent display on the second device; during the visual communication session between the first device and the second device, receiving sensor data from a sensor array, including image data capturing changing facial expressions and motion of the first device user; using the image data to determine 3D mesh model updates; transmitting the 3D mesh model updates to the second device for the second device to update display of the 3D mesh model of the first device user; and receiving from the second device for display on the first device at least one of a 2D video stream or updates to a 3D mesh model of a second device user.

According to the method and system disclosed herein, sending 3D mesh model updates requires significantly less bandwidth than sending image sequences, allowing for smooth communication in bandwidth constrained environments. In addition, on the first device there is lower latency in interpreting changes to the 3D mesh model and sending updates than capturing new images and compressing the images into an image sequence. On the second device, a single node of the 3D mesh model or blend shape can be updated at a time as opposed to having to wait for an entire image encode/compress/transmit/decompress cycle. And even if the second device does not support 3D video communication, the second device can still display the 3D mesh model of the first device user while communicating to the first device through transmission of conventional 2D video.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
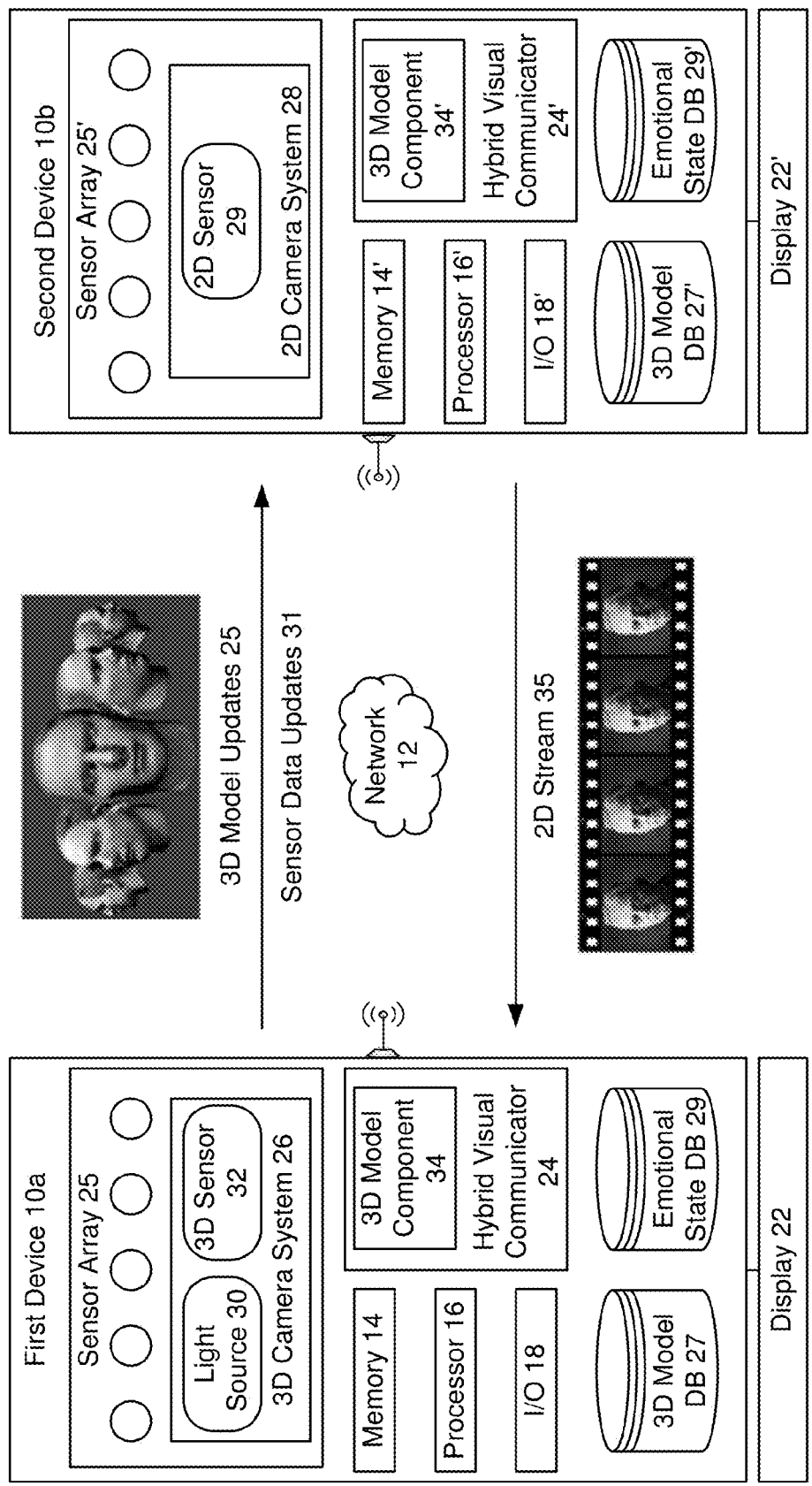
FIG. 1 is a block diagram illustrating an exemplary embodiment of a hybrid visual communication system.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The exemplary embodiments provide a hybrid visual communication method and system between two devices that display the actual likeness, facial expressions, and motion of a user of one of the devices in real time on the other device, while reducing bandwidth. In a further aspect, the user's likeness, facial expressions, and motion may be augmented with a steam of sensor data.

User likeness and bandwidth reduction may be achieved by creating and using a 3D wire frame mesh model (hereinafter referred to as 3D mesh model) of the user that is downloaded and stored on the second device for use during a visual communication session, rather than transmitting a 2D video stream or the full 3D mesh model. During the visual communication session between the two devices, sensor data is collected from a plurality of sensors on the first device. The sensor data includes image data capturing facial expressions and motion of the user as the user moves and changes facial expressions. In one embodiment the sensor data may further include other sensor data relevant to a context of the visual communication session. Examples of other sensor data may include activity data of the user (e.g., accelerometer data, biometric data such as pulse rate etc.) and ambient conditions (e.g., temperature, humidity, and ambient sound levels). The sensor data may be downsampled and aggregated to provide sensor data updates. The image data and optionally the sensor data may be used to determine 3D mesh model updates for updating on the second device the display of the 3D mesh model of the first device user and/or update a setting in which the 3D mesh model is displayed. In one embodiment, the 3D model may be rendered on the second device so that the user's face appears to be looking directly at the user of the second device.

According to a further aspect of exemplary embodiment, the second device may send to the first device either a conventional 2D video stream or 3D model updates of the second device user and other sensor data, depending on the capabilities of the second device.

In a further embodiment where the second device transmits a 3D mesh model of the second device user, the eyes of the first device user may be tracked and corresponding changes made to the 3D mesh model of the second device user to provide a different perspective to the 3D mesh model. Accordingly, this embodiment enables users of the devices to view one another face-to face during a video call with a motion parallax effect, even within a bandwidth constrained network environment.

FIG. 1 is a block diagram illustrating an exemplary embodiment of a hybrid visual communication system. The system 10 may include a first device 10a and a second device 10b, which communicate over a network 12. Both the first and second devices 10a and 10b may include respective a memory 14 and 14', at least one processor 16 and 16', input output devices (I/O) 18 and 18', and a display 22 and 22'.

The memory 14 and 14', the processor 16 and 16' and the I/O 18 and 18' may be coupled together via a system bus (not shown). The memory 14 and 14' may comprise one or more memories comprising different memory types, including RAM, ROM, cache, virtual memory and flash memory, for example. The processor 16 and 16' may include a single processor having one or more cores, or multiple processors having one or more cores. The I/O 18 and 18' is a collection of components that input information and output information. Example components comprising the I/O 18 and 18' include a microphone, speaker, and a wireless network interface controller (or similar component) for communication over the network 12. The processor may execute an operating system (OS) that manages hardware resources and performs basic tasks. Examples of the OS may include Symbian™, Black-Berry OS™, iOS™, Windows™, and Android™. In one embodiment, the display 22 and 22' may be integrated with the first device 10a, while in another embodiment, the display 22 and 22' may be external from the first device 10a. In one embodiment, the first and second devices 10a and 10b may comprise any type of wireless communication device form factor, including a notebook or laptop computer, a tablet, a mobile handset, a television, a set-top box, a wearable computer and a gaming device.

The network 12 over which the first and second devices 10a and 10b communicate may comprise any type of wireless network, including WLAN (wireless local area network), WiMAX (Worldwide Interoperability for Microwave Access) (e.g., 3G/4G), WAN (Wide Area Network), or cellular network.

According to the exemplary embodiment, the first and second devices 10a and 10b may communicate using hybrid visual communication, and therefore further include respective hybrid visual communicators 24 and 24' and sensor arrays 25 and 25'. In one embodiment, the sensor arrays 25 and 25' may include any number of sensors (1-n). Example types of sensors may include, but are not limited to, image sensors such as a 3D camera system 26 or a 2D camera system 28; activity sensors (not shown) such as an accelerometer, a gyroscope, a magnetometer and the like; biometric sensors (not shown) such as a heart rate sensor, a galvanic skin sensor, a pupil dilation sensor, an EKG sensor and the like; and ambient condition sensors (not shown) such as a thermometer, and altimeter, a light sensor, a humidity sensor, a microphone and the like.

According to the exemplary embodiment, the first device 10a supports real-time visual communication with the second device 10b. A 3D mesh model of the user of the first device 10a (i.e., the first device user) is created and then downloaded and stored on the second device 10c for playback on the second device 10b during the visual communication session. A mesh or wire frame model is a visual representation of a physical object (e.g., a user) used in 3D computer graphics in which edges of the physical object are specified where two mathematically continuous smooth surfaces meet, or where the object's constituent vertices are connected using straight lines or curves. Storing the 3D mesh model on the second device 10b eliminates the need to transmit a 2D video stream or the full 3D mesh model from the first device 10a to the second device 10b during each visual communication session. In one embodiment, the hybrid visual communicators 24 and 24' may include a respective 3D model database 27 and 27' for storing the 3D mesh models of users (e.g., those included on the first device user's contact list). In one embodiment, the 3D mesh model may represent the face and head of the user, while in another embodiment, the 3D mesh model may also represent the user's torso or even the entire body.

During the visual communication session, the hybrid visual communicator 24 may collect sensor data from the sensor array 25, including image data from the 3D camera system 26 capturing facial expressions and motion of the first device user and background images, and other sensor data relevant to a context of the visual communication session. The image data and the other sensor data may then be used to determine 3D mesh model updates 25 that are made to the 3D mesh model stored on the second device 10b. In one embodiment, the sensor data is first down sampled and aggregated to generate a subset of sensor data. According to the exemplary embodiment, the subset of sensor data comprises selective changes to the sensor data, referred to herein as sensor data updates 31. In one embodiment, at least the image data and optionally the sensor data updates are used to determine the 3D mesh model updates 25. In one embodiment, this is performed on the first device 10a and only the 3D mesh model updates 25 are sent to the second device 10b. In another embodiment, the image data is used to determine the 3D mesh model updates 25, and both the 3D mesh model updates 25 and the sensor data updates 31 sent to the second device 10b. The second device 10b may then augment the 3D mesh model updates with the sensor data updates 31.

The second device 10b may receive and playback the 3D model updates 25 received from device 10a using the hybrid visual communicator 24'. Alternatively the second device 10b may use the sensor data updates 31 to augment the display of the 3D mesh model, as described below. However, in the embodiment shown, the second device 10b only supports 2D video communication and sends a 2D video stream 27 through a standard 2D camera system 28 and 2D sensor 29. In an alternative embodiment, the second device 10b may also include a 3D camera system 26 to support 3D visual communication with device 10a.

In one embodiment, the 3D mesh model may be created by taking pictures of the first device user with the 3D camera system 26. The resulting image data may be used by the 3D model component 34 to create a digital, 3D mesh model. In one embodiment, the 3D camera system 26 may comprise a structured light source 30 and a 3D (depth) sensor 32. By shining the structured light source 28 (e.g., a pattern of stripes) on an object, the 3D sensor 32 may collect data on the object's shape and optionally the object's appearance (i.e., color). In another embodiment, the 3D camera system 26 may comprise a 3D sensor in combination with a conventional 2D sensor. In a further embodiment, the 3D camera system 26 may comprise a time-of-flight (ToF) camera that resolves distance based on the known speed of light, and measures the time-of-flight of a light signal between the camera and the object for each point of the image. In yet another embodiment, the 3D camera system 26 may comprise a stereoscopic camera with no active lighting required.

In one embodiment, the hybrid visual communicator 24 and 24' and the 3D model component 34 and 34' may be implemented as software applications/components. In another embodiment, the components could be implemented as a combination of hardware and software. Although the hybrid visual communicator 24 and 24' and the 3D model component 34 and 34' are shown as single components, the functionality of each may be combined into a lesser or a greater number of modules/components. For example, in one embodiment, the hybrid visual communicator 24 may be stored locally on the first device 10a, while the 3D model component 34 may be stored on an external server. In the server embodiment, the user's image data may be transmitted to the server for creation the 3D mesh model. Other devices, such as the second device 10b, may then access the server to download the first device user's 3D mesh model for storage in the 3D model database 27'.

Figure 2:
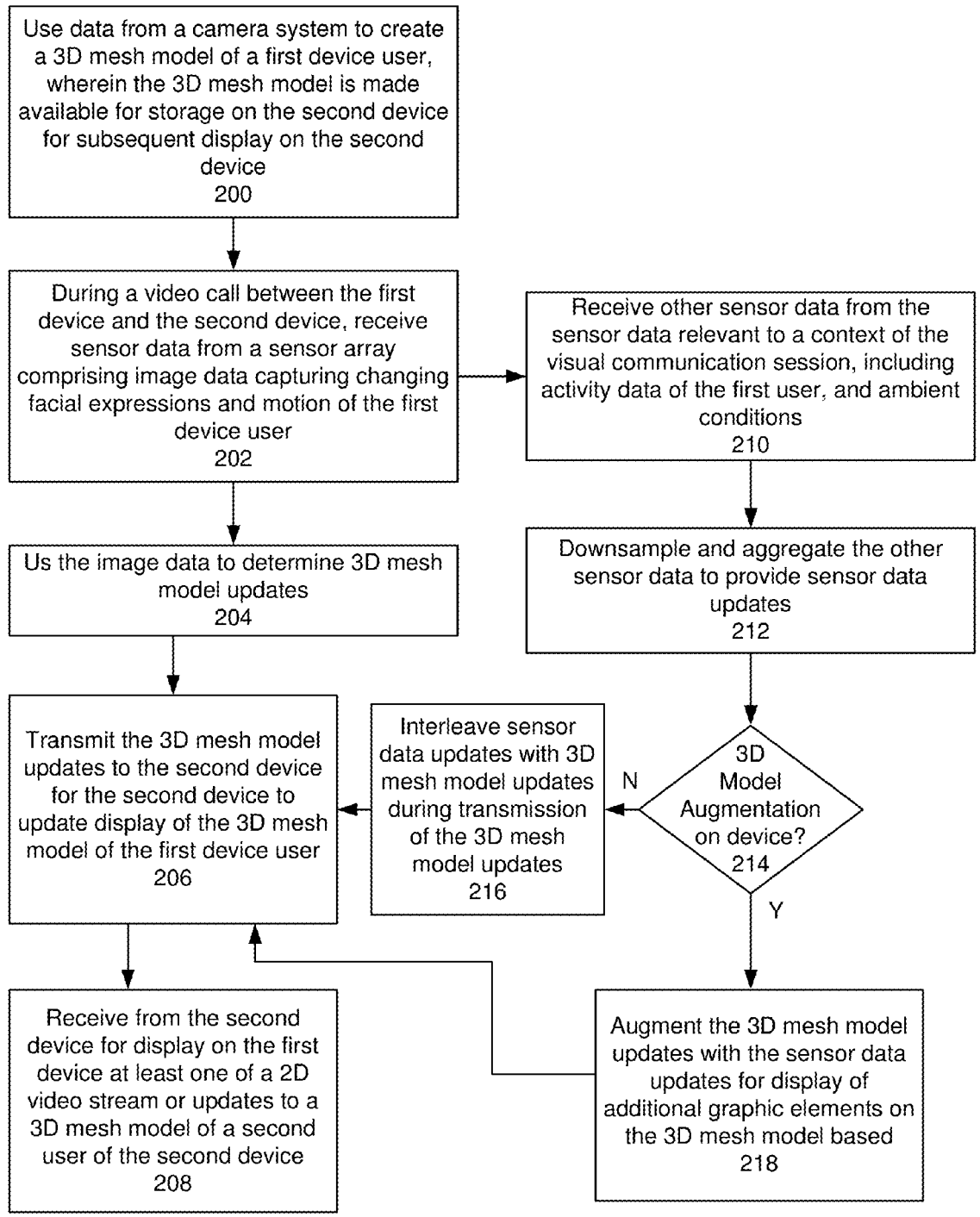
FIG. 2 is a block diagram illustrating a process for providing hybrid visual communication between two or more devices.

FIG. 2 is a block diagram illustrating a process for providing hybrid visual communication between two or more devices 10a and 10b. In one embodiment, the process may begin by using data from a camera system to create a 3D mesh model of a first device user, wherein the 3D mesh model is made available for storage on the second device for subsequent display on the second device (block 200).

As is well-known, a digital 3D mesh or wire frame refers to a polygon mesh comprising a collection of vertices or nodes, edges and faces that defines a shape of an object in 3D computer graphics and solid modeling. In one embodiment, block 200 may be performed by the 3D model component 34 in response to receiving the data from the 3D camera system 26.

According to the exemplary embodiment where the first device comprises a mobile handset having a 3D camera system 26, the structured light source 30 and the 3D sensor 32 may be used together to collect a depth map of the first device user. In one embodiment, the 3D mesh model may be created of the user's face and head, while in another embodiment, the 3D mesh model may also include the user's body or portion thereof. The user may be prompted to move the mobile handset to different positions around the user, for example at a minimum, the hybrid visual communication component 24 may prompt the user to move the device around the user's head and to make different expressions to capture various angles of the user's head and expressions of the user's face.

Figure 3:
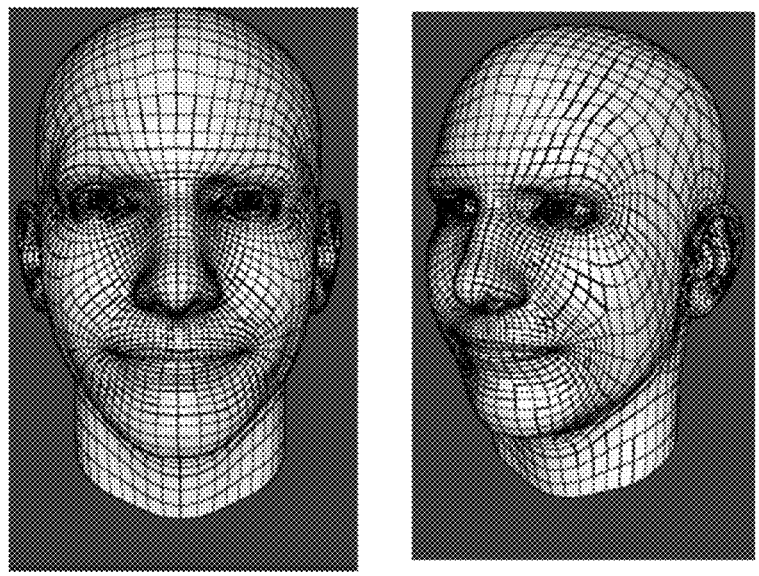
FIG. 3 is a block diagram illustrating representations of a 3D mesh model created of the user's face and head by the 3D model component.

FIG. 3 is a diagram illustrating example representations of a 3D mesh model 300 created of the user's face and head by the 3D model component 34. In one embodiment, the 3D mesh model 300 of the first device user may be stored in the 3D model database 27' in a neutral position.

The 3D model component 34 may also store different facial expressions, and optionally different body positions, as blend shapes representing the facial expressions, and optionally body positions, as linear combinations of blend shape coefficients.

In one embodiment, a color image of the user's face and/or one or more texture maps may also be associated with the 3D mesh model. The 3D model component 34 may then use the resulting data to create a flexible, polygonal mesh representation of at least the person's face and head by fitting images to depth maps of the user's face and head.

Figure 4:
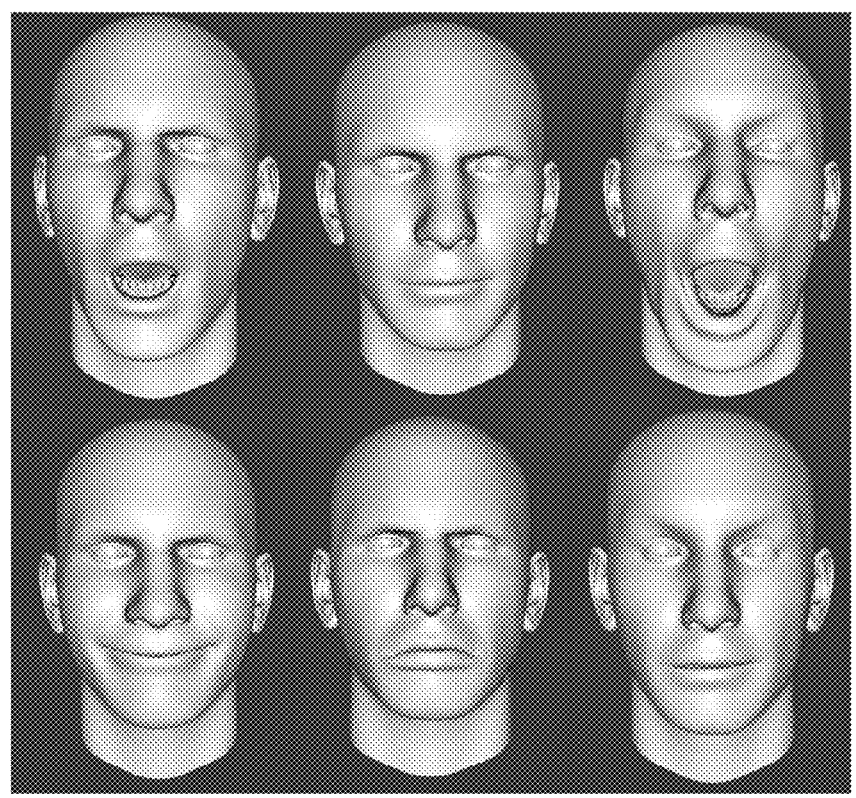
FIG. 4 is a diagram illustrating a series of stored blend shapes representing facial expressions.

FIG. 4 is a diagram illustrating a series of stored blend shapes representing facial expressions. In one embodiment, the blend shapes 400 may be stored in the emotional state database 29' as a predetermined number (e.g., 48) of key poses. In one body, the blend shapes 480 stored in the emotional state databases 29 and 29'.

Referring again to FIG. 1, when a visual communication session is initiated through the hybrid visual communication components 24 and 24', the hybrid visual communication component 24 may query the hybrid visual communication component 24' to determine if the first device user's 3D mesh model is stored on the second device 10b. If not, the 3D mesh model (and any associated texture maps) may be transmitted to the second device 10b and stored in the 3D model database 27' for use during future communication sessions.

In the embodiment where the 3D model creation component 34 is located remotely from the first device 10a, the 3D model creation component 34 may create the 3D mesh model on a server or other remote computer, and then may then send the 3D mesh model to the first device 10a over the network 12 and/or to the second device 10b, or the second device 10b may download the 3D mesh model from the server sometime before or during an initial session with the first device 10a.

In the embodiment where both the first and second devices 10a and 10b support 3D visual communication, the hybrid visual communicators 24 and 24' may exchange 3D mesh models of the respective user' during an initial call between the first and second devices 10a and 10b.

Referring again to FIG. 2, during the visual communication session between the first device 10a and the second device 10b, the hybrid visual communicator 24 may collect sensor data from a sensor array, where the sensor data may include image data capturing changing facial expressions and motion of the first device user (block 202). In one embodiment, image data may comprise depth maps of the first device user periodically captured by the 3D camera system 26 and the structured light source 30. A The hybrid visual communicator 24 uses the image data to determine corresponding 3D mesh model updates (block 204). That is, responsive to the camera system 26 detecting facial expression changes and position changes of the first device user from the image data, the hybrid visual communicator 24 may determine corresponding updates of the 3D mesh model.

In one embodiment, the 3D mesh model updates 25 may be represented as changes to relative vertex positions of the 3D mesh model calculated from the detected position changes of the first device user.

However, because calculating relative vertex position changes may be computationally expensive, the exemplary embodiment may use blend shapes 400 to represent 3D facial expressions (e.g., happy, sad, right eye closed, etc.) or even 3D body poses (e.g., right arm up). Therefore, in another embodiment, the 3D mesh model updates 25 may then be represented as selected blend shape coefficients or other enumeration of one or more selected blend shapes.

During the visual communication session, the hybrid visual communicator 24 may receive the depth maps of the first device user periodically captured by the 3D camera system 26. The hybrid visual communicator 24 may then use the depth maps to retrieve one or more of the stored blend shapes 400 from the emotional state database 29. Coefficients of the blend shape(s) that match within a minimum error threshold may then be used as the 3D model updates 25.

The 3D mesh model updates may be transmitted to the second device for the second device to update display of the 3D mesh model of the first device user (block 206). In one embodiment, updating the display of 3D mesh model on the second device may include updating the 3D mesh model itself, updating a background in which the 3D mesh model is overlaid, or a combination thereof. It should be noted that in one embodiment, what is being transmitted from the first device to the second device is not video, but data. On the second device, the received data is turned into video by animating the data frame-to frame for display.

In one embodiment, the image data may include an image of at least a portion of the background of the first device user. According to one aspect of the exemplary embodiment, one or more images of the background may be transmitted from the first device 10a to the second device 10b so that 3D mesh model stored on the second device 10b may be superimposed over the background when displayed on the second device 10b during the visual communication session. In one embodiment, the images of the background may be transmitted to the second device 10b once at the beginning of the visual communication session. The background could then be stored as a texture or image over which the 3D mesh model is superimposed. In another embodiment, video of the background may be streamed to the second device 10b in environments where transmission bandwidth is not an issue.

To further reduce bandwidth in one embodiment, the first device 10a may send to the second device 10b selective updates to portions of the background as changes in position of the first device user are detected. For example, as the first device user turns their head, previously obscured portions of the background will be revealed. The hybrid visual communicator 24 may then send these newly revealed background portions to the second device 10b as updates to the background for display.

Once the second device 10b receives the 3D model updates 25, the hybrid visual communicator 24' uses the 3D model updates 25 to animate, render or modify playback of the 3D mesh model displayed on the second device to express the perceived emotional state and/or the body position of the user in real-time. If the 3D model updates 25 comprise changes to vertices, then the hybrid visual communicator 24' uses the 3D model updates 25 to update the vertices of the 3D mesh model. If the 3D model updates 25 comprise blend shape coefficients, then the hybrid visual communicator 24' uses the blend shape coefficients to select blend shapes or key poses from the emotional state database 29' and then interpolates between a neutral expression of the original 3D mesh model and a selected key pose, or between a previous key pose and the selected key pose. In one embodiment, one example use for the 3D mesh model of the user is to use the 3D mesh model as a reliable signature to identify or authenticate the user.

During the visual communication session, the first device may receive from the second device for display on a display of the first device at least one of a 2D video stream or updates to a 3D mesh model of a second user of the second device (block 208).

According to one embodiment, the hybrid visual communicators 24 and 24' may be able to stream a standard 2D stream 35 of images as well depending on the device's capabilities, hence use of the phrase 2D/3D video communication. This will allow users that don't have the requisite 3D camera system to communicate with users with the more advanced system.

When a device is equipped with the 3D camera system 26, the first device may support both 3D video communication and 2D video communication. Likewise, the second device may support both 3D video communication and 2D video communication. According to one aspect of the exemplary embodiment, the hybrid visual communicators 24 and 24' may allow users to selectively switch back and forth between 3D and 2D visual modes as desired.

According to a further aspect of the exemplary embodiment, playback of the 3D mesh model of the user may be augmented using streams of sensor data updates for display of additional graphic elements on the 3D mesh model. Such augmentation may be performed on either the first device 10a or the second device 10b, as described below.

Referring to FIG. 2, besides receiving image data from the sensor array (block 202), the hybrid visual communicator 24 may also receive other sensor data relevant to a context of the visual communication session, including activity data of the first device user, and ambient conditions (block 210).

In one embodiment, the activity data of the first device user may be collected from activity sensors including one or more of an accelerometer, a gyroscope, a magnetometer, which may be used to determine movement of the first device and/or the first device user; and biometric sensors including heart rate sensor, a galvanic skin sensor, a pupil dilation sensor, an EKG sensor, any of which may be used to determine biometric data and perceived emotional state of the first device user. The ambient condition data may be collected from ambient condition sensors including one or more of a thermometer, an altimeter, a light sensor, a humidity sensor, a microphone, and the like.

The other sensor data may be downsampled and aggregated to provide sensor data updates (block 212). Each of the sensors comprising the sensor array 25 may capture different types of sensor data at various rates. For example, accelerometers may capture accelerometer data at 100 Hz-200 Hz, while a thermometer may sample temperature data at 1 Hz or lower.

According to one aspect of the exemplary embodiment, for sensor data captured/sampled at high frequencies, the hybrid visual communicator 24 or a separate data manager may downsample the sensor data to a lower rate. For some types of sensor data, the hybrid visual communicator 24 may average the sensor data to further reduce the number of data samples.

The hybrid visual communicator 24 may then aggregate the downsampled sensor data from various sensors into a lower number of total samples for optional transmission over the network. Thus, assuming M total data samples were received over a particular time period, the downsampling and aggregation may reduce the total number to N sensor data updates to provide an M×N data conversion, where N is significantly less than M. For example, heart rate data collected at a frequency of 100 Hz could be converted into a single variable indicating a perceived emotion for instance, such as whether a person is becoming excited/angry/nervous or not.

If the sensor data updates 31 are to be transmitted to the second device 10b, then the N data sensor data updates 31 (rather than M) may then be encoded into packets and transmitted to the second device 10b according to a defined communication protocol. The packets containing the sensor data updates 31 may be interleaved with the 3D model updates 25 that may be sent at a different frequency. On the second device, the hybrid visual communicator 24' may decode the data sample packets according to the communication protocol.

Based on device configuration that may be exchanged between the first and second devices and/or available bandwidth, it is determined whether the 3D model augmentation is to be performed on the first device 10a or on the second device 10b (block 214).

In response to determining that 3D model augmentation is to be performed on the second device 10b, the sensor data updates 31 are interleaved with the 3D mesh model updates during transmission of the 3D mesh model updates (block 216). In this embodiment, the sensor data updates may be sent to the second device (and/or a remote server) with the 3D model updates 25 as additional dimensions of streaming metadata to augment playback of the 3D mesh model on the second device 10b.

In response to determining that the 3D model augmentation is to be performed on the first device 10a, the 3D mesh model updates are augmented with the sensor data updates for display of additional graphic elements on the 3D mesh model (block 218).

In this embodiment, the sensor data updates 31 may be used on the first device 10a as additional inputs to the emotional state database 29 to augment the perceived emotional state of the user prior to the 3D model updates 25 being sent to the second device 10b. For example, if the sensor data updates 31 indicate that the ambient temperature is relatively hot, and the biometric sensors indicate that the user has a fast pulse, then it may be inferred that there is a high likelihood that the first device user is sweating. Accordingly, this information may be used to display sweat droplets on the 3D mesh model during playback on the second device 10b. Therefore, the emotional state databases 29 and/or 29' may further include a matrix of sensor values associated with the blend shapes to indicate different states of the user based on current values of the sensor data updates 31 (e.g., hot/sweaty, cold, nervous, agitated, happy, sad, and the like). As another example, data from the ambient sensors may indicate that it is raining at the first device user's location. This information may then be used to display clouds and rain droplets during playback of the 3D mesh model on the second device.

Figure 5:
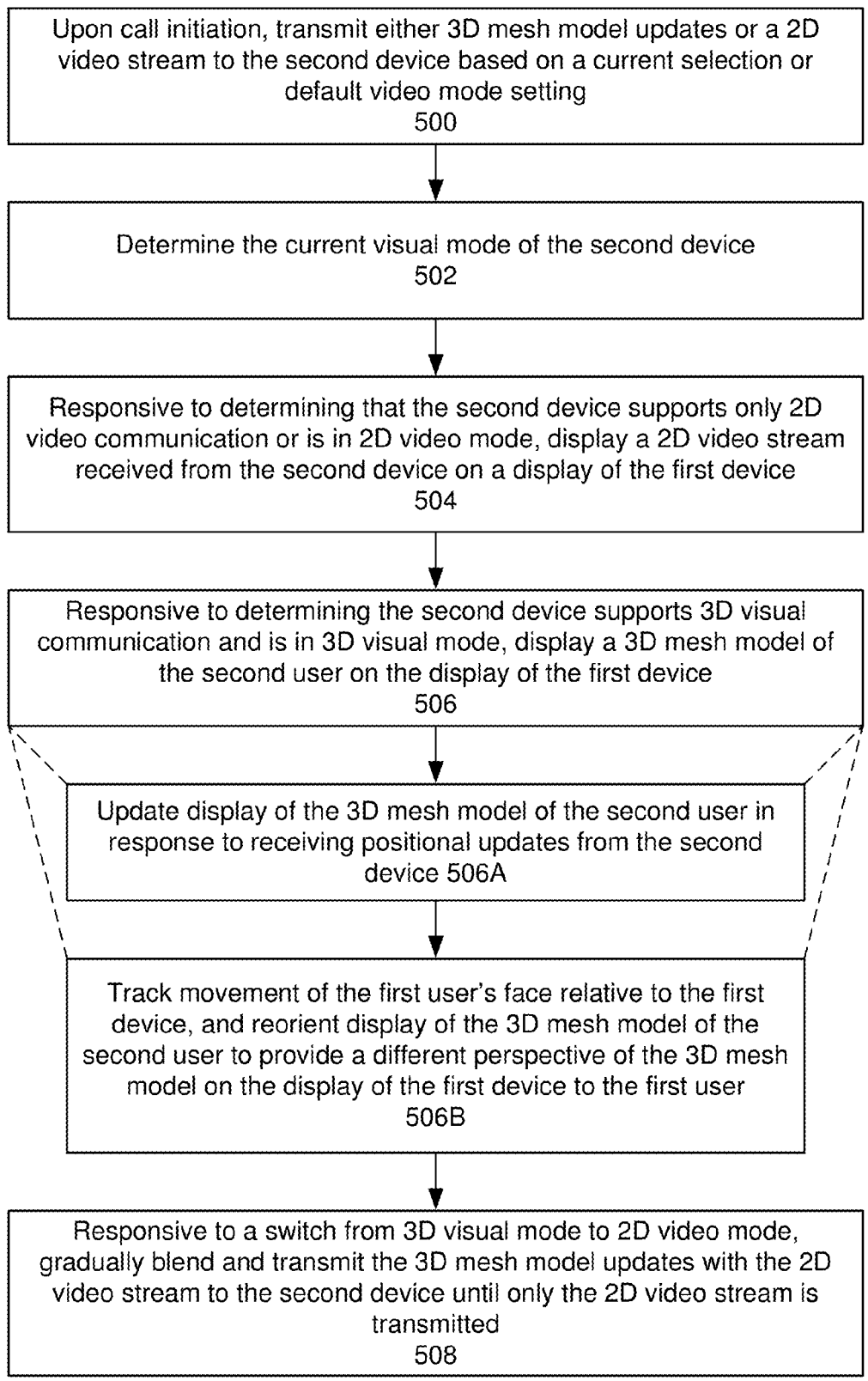
FIG. 5 is a diagram illustrating the processing performed by the hybrid video communicator during various combinations of 3D and 2D visual modes between the first device and the second device.

FIG. 5 is a diagram illustrating the processing performed by the hybrid visual communicator 24 during various combinations of 3D visual mode and 2D video mode between the first device 10a and the second device 10b. Upon call initiation, the hybrid visual communicator 24 transmits either 3D model updates 25 (and optionally sensor data updates 31) in 3D visual mode or a 2D video stream 27 in 2D video mode to the second device based on a current selection or default video mode setting (block 500).

In one embodiment, the current selection of the visual mode may selected manually by the user or selected automatically by the hybrid visual communicator 24. For example, the hybrid visual communicator 24 may determine that the first device 10a includes a 3D camera system and may then allow the user to choose 3D visual mode or 2D video mode (e.g., via a GUI or a menu). If the hybrid visual communicator 24 discovers that the device only includes a 2D camera system, then the hybrid visual communicator 24 may default to 2D video mode.

According to a further embodiment, the hybrid visual communicator 24 may automatically suggest 2D video mode or 3D visual mode to the user based upon available bandwidth, and/or dynamically change the video mode based on changes to the bandwidth during the visual communication session.

If the current selection or default visual mode setting is 3D visual mode, the hybrid visual communicator 24 may also poll its counterpart on the second device to determine whether or not the 3D mesh model is present on the other device, or the second device may perform a look up to see if the 3D mesh model is present based on an ID of the caller, and if not, request the 3D mesh model to be sent from the first device. If the second device indicates that the 3D mesh model is present on the second device, then the hybrid video communicator 24 need not send the 3D mesh model to save bandwidth.

The hybrid visual communicator 24 also determines the current visual mode of the second device 10b (block 502). This may be accomplished by the second device informing the first device of the current video mode of the second device. During this exchange, the hybrid visual communicators 24 and 24' may also exchange mode capability, e.g., whether the device supports 3D and 2D video mode, or only 2D video mode. In a further embodiment, the hybrid visual communicators 24 and 24' may also exchange device configuration information, which may be stored as metadata, such as image sensor, light source, bandwidth information and the like.

Responsive to determining that the second device supports only 2D video communication or is in 2D video mode, the hybrid visual communicator 24 displays a 2D video stream received from the second device on a display of the first device (block 504).

Responsive to determining the second device supports 3D video communication and is in 3D visual mode, the hybrid visual communicator 24 displays a 3D mesh model of the second user on the display of the first device, which may have been previously stored on the first device (block 506).

In one embodiment, block 406 may include two sub steps. The first sub step may include updating display of the 3D mesh model of the second user in response to receiving 3D mesh model updates from the second device (block 506A). On the first device 10a, the hybrid visual communicator 24 may render the 3D mesh model so that a face of the second device user appears to be looking directly at the first device user. Once the hybrid visual communicator 24 receives the position updates, the hybrid visual communicator 24 may use the 3D mesh model updates to modify the expression and orientation of second user's 3D mesh model that may be stored locally on the first device 10a. During the call, portions of each user's color image may be selectively updated on the device to which they are sent at a granularity of a color texture within a polygon of the respective 3D mesh model. More important or active regions can be preferentially updated more often.

According to a further embodiment, the second sub step may include tracking movement of the first user's face relative to the first device, and reorienting display of the 3D mesh model of the second user to provide a different perspective of the 3D mesh model on the display of the first device (block 506B).

This is called the motion parallax effect, and is what happens in true face-to-face interactions. Parallax is a difference in apparent position of an object viewed along two different lines of sight, and may be measured by an angle of inclination between those two lines. This may be achieved by the hybrid visual communicator 24 using the 3D sensor 32 (such as a motion parallax 3D sensor or stereoscopic sensor) to track the location of the first user's eyes, and adjusting the perspective of the 3D mesh model of the second device user in response to eye location changes of the first device user. In another embodiment, a gaze tracker may be used instead of, or in addition to, the 3D sensor.

Responsive to a switch from 3D visual mode to 2D video mode on the first device, the hybrid visual communicator 24 may gradually blend and transmit a stream of the 3D mesh model updates with the 2D video stream to the second device until only the 2D video stream is transmitted (block 508).

The exemplary embodiments provide advantages over conventional 2D-2D only video communication systems. For example, transmitting position updates of nodes or vertices in a mesh model or blend shape coefficients requires orders of magnitude less bandwidth than sending image sequences, allowing for smooth communication in bandwidth constrained environments. In addition, there is lower latency in interpreting changes to the facial expressions and movement of the user and sending 3D mesh model updates than capturing new images and compressing them into an image sequence. A single mesh node can be updated at a time as opposed to having to wait for an entire image encode/compress/transmit/decompress cycle.

With respect to presentation, the 3D mesh models may be rendered to look directly at the viewer, as opposed to down. If the user moves their head during the video call, the user's 3D mesh model may be reoriented on the other device to present the view with new information, just as in real life. Furthermore, 3D mesh models can be used as a unique signature of a user, potentially in security solutions. The ability to capture and selectively update color images of the user's face may thwart attempts to use fake models of the user to circumvent security.

A method and system for hybrid visual communication system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

I claim:

1. A method for visual communication between a first device and a second device, comprising:
    using data from a camera system to create a 3D mesh model of a first device user, wherein the 3D mesh model is made available for storage on the second device for subsequent display on the second device;
    during the visual communication session between the first device and the second device, receiving sensor data from a sensor array, including image data capturing changing facial expressions and motion of the first device user;
    using the image data to determine 3D mesh model updates;
    transmitting the 3D mesh model updates to the second device for the second device to update display of the 3D mesh model of the first device user, wherein the 3D mesh model updates are represented as at least one of a) changes to relative vertex positions of the 3D mesh model calculated from the detected position changes of the first device user, and b) selected blend shape coefficients or other enumeration of one or more selected blend shapes; and
    receiving from the second device for display on the first device at least one of a 2D video stream or updates to a 3D mesh model of a second device user.

2. The method of claim 1, wherein receiving sensor data from the sensor array further comprises: receiving other sensor data relevant to a context of the visual communication session, including activity data of the first device user, and ambient conditions.

3. The method of claim 2, further comprising: downsampling and aggregating the other sensor data to provide sensor data updates.

4. The method of claim 3, wherein a total of M data samples are received over a time period, and wherein the downsampling and aggregating reduce the M data samples to N sensor data updates to provide an MxN data conversion, wherein N is significantly less than M.

5. The method of claim 3, further comprising: interleaving the sensor data updates with the 3D mesh model updates during transmission of the 3D mesh model updates to the second device.

6. The method of claim 3, further comprising: augmenting the 3D mesh model updates with the sensor data updates for display of additional graphic elements on the 3D mesh model prior to transmitting the 3D mesh model updates to the second device.

7. A method for visual communication between a first device and a second device, comprising:
    using data from a camera system to create a 3D mesh model of a first device user, wherein the 3D mesh model is made available for storage on the second device for subsequent display on the second device;
    during the visual communication session between the first device and the second device, receiving sensor data from a sensor array, including image data capturing changing facial expressions and motion of the first device user;
    using the image data to determine 3D mesh model updates;
    transmitting the 3D mesh model updates to the second device for the second device to update display of the 3D mesh model of the first device user, wherein the image data may include an image of at least portions of a background of the first device user, wherein the background is transmitted to the second device so that 3D mesh model is superimposed over the background when displayed on the second device during the visual communication session; and
    receiving from the second device for display on the first device at least one of a 2D video stream or updates to a 3D mesh model of a second device user.

8. The method of claim 1, further comprising: sending the 3D mesh model updates during a 3D visual mode and sending a stream of 2D video to the second device during a 2D video mode.

9. The method of claim 8, further comprising: allowing the first user to selectively switch back and forth between the 3D visual mode and the 2D video mode.

10. The method of claim 8, further comprising: at least one of automatically suggesting the 2D video mode or the 3D visual mode to the user based upon available bandwidth, and dynamically changing video modes based on changes to the bandwidth during the visual communication session.

11. The method of claim 1, further comprising:
    responsive to determining that the second device supports only 2D video communication or is in 2D video mode, displaying a 2D video stream received from the second device on a display of the first device.

12. The method of claim 1, further comprising:
    responsive to determining the second device supports 3D visual communication or is in 3D visual mode:
        displaying a 3D mesh model of the second device user on the first device;
            updating display of the 3D mesh model of the second device user in response to receiving 3D mesh model updates from the second device; and
            tracking movement of the first device user's face relative to the first device and reorienting display of the 3D mesh model of the second device user to provide a different perspective of the 3D mesh model on a display of the first device.

13. The method of claim 12, wherein displaying a 3D mesh model of the second device user on the first device further comprises: rendering the 3D mesh model on the first device so that a face of a second device user appears to look directly at the first device user.

14. The method of claim 13, further comprising: receiving on the first device a color image of the second device user's face from the second device and selectively updating the color image at a granularity of a color texture within a polygon of the 3D mesh model.

15. A method for visual communication between a first device and a second device, comprising:
    using data from a camera system to create a 3D mesh model of a first device user, wherein the 3D mesh model is made available for storage on the second device for subsequent display on the second device;
    during the visual communication session between the first device and the second device, receiving sensor data from a sensor array, including image data capturing changing facial expressions and motion of the first device user;
    using the image data to determine 3D mesh model updates;
    transmitting the 3D mesh model updates to the second device for the second device to update display of the 3D mesh model of the first device user, wherein responsive to a switch from 3D visual mode to 2D video mode on the first device, gradually blending and transmitting a stream of the 3D mesh model updates with a 2D video stream to the second device until only the 2D video stream is transmitted; and
    receiving from the second device for display on the first device at least one of a 2D video stream or updates to a 3D mesh model of a second device user.

16. A method for visual communication between a first device and a second device, comprising:
    using data from a 3D camera system comprising a structured light source and a 3D sensor that together collect a depth map of the first user, to create a 3D mesh model of a first device user, the 3D mesh model created by prompting the first device user to move the first device around a head of the first device user and for the first device user to make different expressions and to capture different angles of the first device user's head and expressions of the first device user's face, and wherein the 3D mesh model is made available for storage on the second device for subsequent display on the second device;
    during the visual communication session between the first device and the second device, receiving sensor data from a sensor array, including image data capturing changing facial expressions and motion of the first device user;
    using the image data to determine 3D mesh model updates;
    transmitting the 3D mesh model updates to the second device for the second device to update display of the 3D mesh model of the first device user; and
    receiving from the second device for display on the first device at least one of a 2D video stream or updates to a 3D mesh model of a second device user.

17. The method of claim 1, further comprising: using the 3D mesh model as a signature to identify the first device user.

18. A device, comprising:
    a memory;
    a processor coupled to the memory, the processor configured to:
        use data from a camera system to create a 3D mesh model of the device user, wherein the 3D mesh model is made available for storage on the second device for subsequent display on the second device;
        during a visual communication session between the device and a second device, receive sensor data from a sensor array, including image data capturing changing facial expressions and motion of the device user;
using the image data to determine 3D mesh model updates;
transmit the 3D mesh model updates to the second device for the second device to update display of the 3D mesh model of the device user, wherein the 3D mesh model updates are represented as at least one of a) changes to relative vertex positions of the 3D mesh model calculated from the detected position changes of the first device user, and b) selected blend shape coefficients or other enumeration of one or more selected blend shapes; and
receive from the second device for display on the device at least one of a 2D video stream or updates to a 3D mesh model of a second device user.

19. The device of claim 18, wherein the processor further receives other sensor data relevant to a context of the visual communication session, including activity data of the first device user, and ambient conditions.

20. The device of claim 19, wherein the processor down-samples and aggregates the other sensor data to provide sensor data updates.

21. The device of claim 20, wherein a total of M data samples are received over a time period, and wherein the processor down samples and aggregates to reduce the M data samples to N sensor data updates to provide an MxN data conversion, wherein N is significantly less than M.

22. The device of claim 20, wherein the processor interleaves the sensor data updates with the 3D mesh model updates during transmission of the 3D mesh model updates to the second device.

23. The device of claim 20, wherein the processor augments the 3D mesh model updates with the sensor data updates for display of additional graphic elements on the 3D mesh model prior to transmission of the 3D mesh model updates to the second device.

24. A device, comprising:
a memory;
a processor coupled to the memory, the processor configured to:
use data from a camera system to create a 3D mesh model of the device user, wherein the 3D mesh model is made available for storage on the second device for subsequent display on the second device;
during a visual communication session between the device and a second device, receive sensor data from a sensor array, including image data capturing changing facial expressions and motion of the device user;
use the image data to determine 3D mesh model updates;
transmit the 3D mesh model updates to the second device for the second device to update display of the 3D mesh model of the device user, wherein the image data may include an image of at least portions of a background of the device user, wherein the background is transmitted to the second device so that 3D mesh model is superimposed over the background when displayed on the second device during the visual communication session and
receive from the second device for display on the device at least one of a 2D video stream or updates to a 3D mesh model of a second device user.

25. The device of claim 18, wherein the 3D mesh model updates are sent during a 3D visual mode and a stream of 2D video is sent to the second device during a 2D video mode.

26. The device of claim 25, wherein the processor allows the first user to selectively switch back and forth between the 3D visual mode and the 2D video mode.

27. The device of claim 25, wherein the processor is further configured to at least one of: automatically suggest the 2D video mode or the 3D visual mode to the user based upon available bandwidth, and dynamically change video modes based on changes to the bandwidth during the visual communication session.

28. The device of claim 18, wherein the processor is further configured to:
responsive to determining the second device supports 3D video communication or is in 3D visual mode:
display a 3D mesh model of the second device user on the device;
update display of the 3D mesh model of the second device user in response to receiving 3D mesh model updates from the second device; and
track movement of the first device user's face relative to the device and reorient display of the 3D mesh model of the second device user to provide a different perspective of the 3D mesh model on a display of the device.

29. The device of claim 18, wherein the processor is further configured to:
responsive to determining that the second device supports only 2D video communication or is in 2D video mode, display a 2D video stream received from the second device on a display of the device.

30. The device of claim 28, wherein the 3D mesh model of the second device user is displayed on the device so that a face of the second device user appears to look directly at the first device user.

31. The device of claim 30, wherein a color image of the second device user's face is received from the second device and selectively updated at a granularity of a color texture within a polygon of the 3D mesh model.

32. A device, comprising:
a memory;
a processor coupled to the memory, the processor configured to:
use data from a camera system to create a 3D mesh model of the device user, wherein the 3D mesh model is made available for storage on the second device for subsequent display on the second device;
during a visual communication session between the device and a second device, receive sensor data from a sensor array, including image data capturing changing facial expressions and motion of the device user;
use the image data to determine 3D mesh model updates;
transmit the 3D mesh model updates to the second device for the second device to update display of the 3D mesh model of the device user, wherein the 3D mesh model is sent to the second device as a 3D visual stream, wherein the processor is further configured to:
responsive to a switch from 3D visual mode to 2D video mode, gradually blend and transmit a stream of the 3D mesh model updates with a 2D video stream to the second device until only the 2D video stream is transmitted; and
receive from the second device for display on the device at least one of a 2D video stream or updates to a 3D mesh model of a second device user.

33. A device, comprising:
a memory;
a processor coupled to the memory, the processor configured to:

use data from a camera system comprising a structured light source and a 3D sensor that together collect a depth map of the first user to create a 3D mesh model of the device user, wherein the processor is further configured to prompt the first device user to move the communication device around a head of the first device user and for the first device user to make different expressions to capture different angles of the first device user's head and expressions of the first device user's face, wherein the 3D mesh model is made available for storage on the second device for subsequent display on the second device;

during a visual communication session between the device and a second device, receive sensor data from a sensor array, including image data capturing changing facial expressions and motion of the device user;

using the image data to determine 3D mesh model updates;

transmit the 3D mesh model updates to the second device for the second device to update display of the 3D mesh model of the device user; and receive from the second device for display on the device at least one of a 2D video stream or updates to a 3D mesh model of a second device user.

34. The device of claim 18, wherein the 3D mesh model is used as a signature to identify the first user.

35. An executable software product stored on a non-transitory computer-readable storage medium containing program instructions for providing a visual communication session between a first device and a second device, the program instructions for:

using data from a camera system to create a 3D mesh model of a first device user of, wherein the 3D mesh model is made available for storage on the second device for subsequent display on the second device;

during the visual to medication session between the first device and the second device, receiving sensor data from a sensor array, including image data capturing changing facial expressions and motion of the first device user;

using the image data to determine 3D mesh model updates;

transmitting the 3D mesh model updates to the second device for the second device to update display of the 3D mesh model of the first device user, wherein the 3D mesh model updates are represented as at least one of a) changes to relative vertex positions of the 3D mesh model calculated from the detected position changes of the first device user, and b) selected blend shape coefficients or other enumeration of one or more selected blend shapes; and receiving from the second device for display on the first device at least one of a 2D video stream or updates to a 3D mesh model of a second device user.

36. A communication system, comprising:

a first device having a 3D camera system, a first display, and a first processor that executes a first hybrid video communicator application; and a second device having at least one of a 2D camera system and a 3D camera system, a second display, and a second processor that executes a second hybrid video communicator application;

wherein during a video call between the first device and the second device, the first device transmits a 3D mesh model of a first device user to the second device if not already present on the second device, and in response to detecting movement of the first device user's with the 3D camera system, transmits updates to the 3D mesh model to the second device, wherein the 3D mesh model updates are represented as at least one of a) changes to relative vertex positions of the 3D mesh model calculated from the detected position changes of the first device user, and b) selected blend shape coefficients or other enumeration of one or more selected blend shapes; and wherein the second hybrid video communicator application on the second device receives and plays back the 3D mesh model and updates to 3D mesh model on the second display based on the updates received from the first device; and at least one of: a) sends a 2D video stream of a second device to the first device using the standard 2D camera system, and b) transmits a 3D mesh model of the second device user to the first device if not already present on the first device, and in response to detecting movement of the second device user, transmits updates to the 3D mesh model of the second device user to the first device.

37. A method for visual communication between a first device and a second device, comprising:

using data from a camera system to create a 3D mesh model of a first device user, wherein the 3D mesh model is made available for storage on the second device for subsequent display on the second device;

during the visual communication session between the first device and the second device, receiving sensor data from a sensor array, including image data capturing changing facial expressions and motion of the first device user;

using the image data to determine 3D mesh model updates;

receiving other sensor data from the sensor data relevant to a context of the visual communication session, including activity data of the first user, and ambient conditions;

downsampling and aggregating the other sensor data to provide sensor data updates, interleaving the sensor data updates with the 3D mesh model updates during transmission of the 3D mesh model updates to the second device;

augmenting the 3D mesh model updates with the sensor data updates for display of additional graphic elements on the 3D mesh model based; and transmitting the 3D mesh model updates to the second device for the second device to update display of the 3D mesh model of the first device user.

* * * * *